Patented Feb. 23, 1932

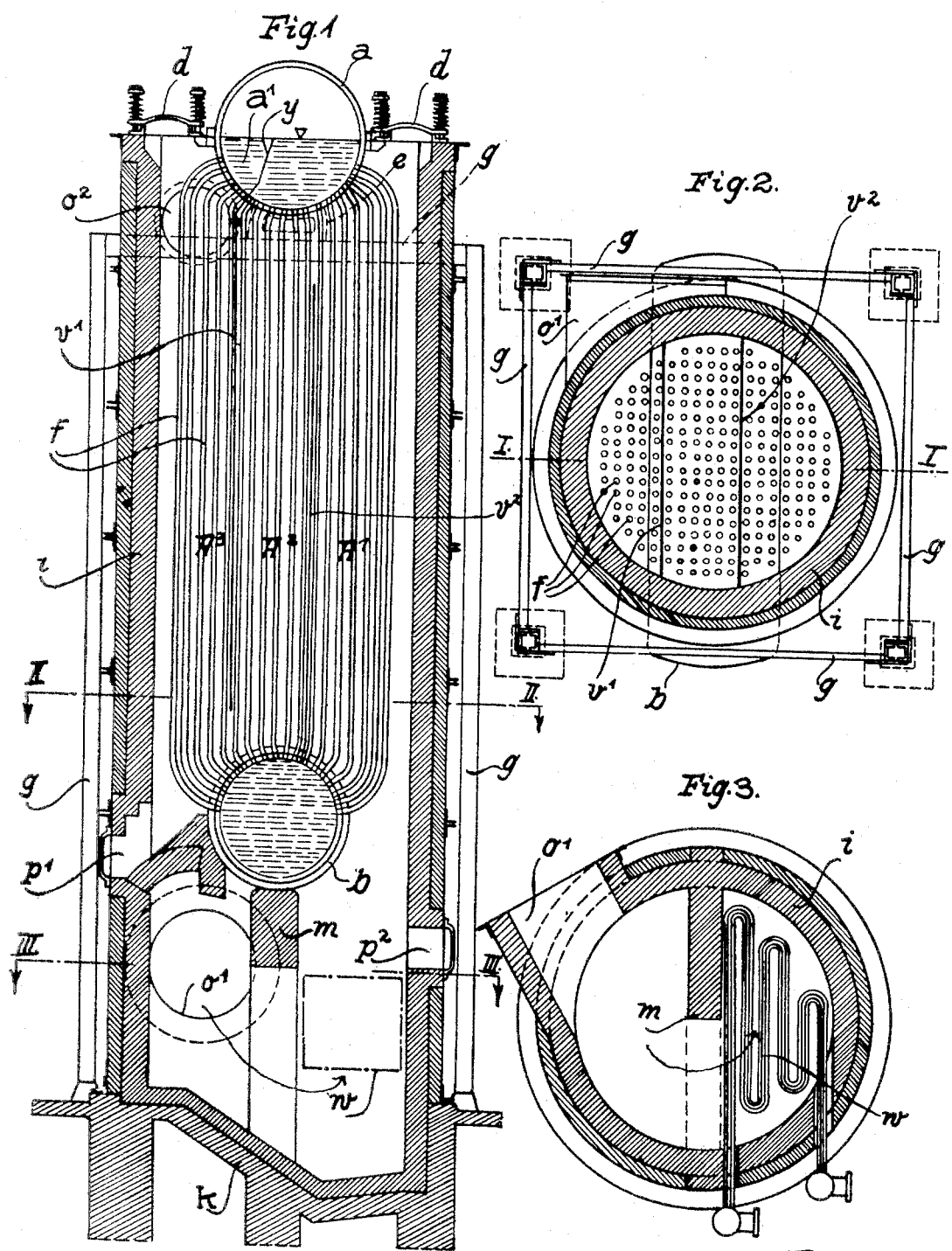

1,846,428

UNITED STATES PATENT OFFICE

GEORG ALBERT KUNZ, OF FRANKFORT-ON-THE-MAIN, GERMANY

VERTICAL TUBE BOILER FOR WASTE HEAT, ESPECIALLY FROM WATER GAS

Application filed March 29, 1930, Serial No. 440,112, and in Germany March 23, 1929.

Vertical tube boilers for waste heat are known which have upper and lower cylindrical vertical drums connected by means of water tubes bundled together to form a cylinder. This construction possesses the inconvenience that the evaporating water surface can, for practical reasons, only have a small cross section. Consequently such boilers, when more highly stressed, yield comparatively wet steam. A further disadvantage consists in that the water circulation between the upper and lower vertical cylindrical drums can only be produced by special water drop tubes mostly arranged on the outer side of the unit.

This invention relates to a vertical tube boiler for waste heat, especially from water gas, which obviates the above mentioned inconveniences. An important feature consists in that the upper and lower drums are horizontal and the water tubes connecting same are united to form a cylindrical nest of tubes, one portion of which tubes is bent outwards from the connection points, the remaining portion being straight. The nest of tubes is surrounded as closely as possible by a cylindrical shaft jacket for the passage of the waste gases, in which jacket baffle walls are arranged in such a manner that the waste gases, from the admission point first brush in a rising and in a descending flow along the tubes containing the evaporating water and then in a rising flow along the tubes supplying the feed water to the lower drum. The upper drum has a feed water compartment, separated from the evaporation compartment by a partition lying substantially in alignment with the baffle wall which deflects the waste gases designed for preheating the feed water.

An embodiment of the invention is illustrated by way of example in the accompanying drawings in which Fig. 1 is a longitudinal section on line I—I of Fig. 2, Fig. 2 is a cross section on line II—II of Fig. 1, Fig. 3 is a cross section on line III—III of Fig. 1.

The boiler consists of an upper drum $a$ and of a lower drum $b$, both horizontally arranged and connected by straight water tubes $f$, which are however bent at the connection points. These tubes form a cylindrical nest of tubes. In this manner the upper drum can be made of any desired length for the purpose of increasing the evaporating surface. The water circulation is regulated by vertical baffle walls $v^1$, $v^2$, the support $e$ carrying the upper drum is borne by a self supporting frame $g$ which at a distance surrounds a cylindrical shaft jacket $i$ tightly surrounding the water tubes $f$. The jacket is extended down to the foundation $k$ and anchored therein. It carries by its central transverse wall $m$ the lower drum $b$ and has a lower admission opening $o^1$ and an upper discharge opening $o^2$ for the passage of the waste gases. The cylindrical jacket provided with manholes $p^1$ and $p^2$, built in the usual manner of refractory and insulating materials, is closed by a lid, in which valves $d$ are provided for explosions, which might occur in the upper nest of tubes. These are called explosion valves.

The heating gases pass through the opening $o^1$ into the cylindrical jacket and, deflected by the baffle walls, brush in succession from below upward along the first group $A^1$ of tubes, then along the second group of tubes $A^2$ from above downwards and finally along the tubes of the third group $A^3$ in upward direction, from whence they are discharged through the discharge opening $o^2$. The feeding of the boiler is effected in a feed compartment $a^2$ separated by a partition $y$ in the upper drum, this partition being in alignment with the baffle wall $v^1$.

The circulation of the water goes from the feed compartment $a^1$ through the descending group $A^3$ of water tubes in which the preheating takes place, through the lower drum $b$, through the first group $A^1$ and the second group $A^2$ of the nest of tubes, in which it is continually circulated and evaporates.

The cylindrical shaft jacket also surrounds the superheater $w$ (shown in dot-dash lines in Fig. 1), situated under the boiler proper and constructed in known manner as radiation superheater, or which can be regulated by a suitable arrangement of registers and dampers. In this manner it is possible to heat the superheater together with the boiler within one single cylinder jacket without loss of heat.

I claim:—

A vertical tube boiler for waste heat especially from water gas comprising in combination a horizontal upper drum, a horizontal lower drum, water tubes connecting said upper and said lower drums forming a cylindrical nest of tubes, said water tubes being straight for the major portion of their length and curved at their ends where they connect with said drums and a cylindrical hollow casing enclosing said water tubes and forming a passage for the waste gases.

In testimony whereof I affix my signature.

GEORG ALBERT KUNZ.